United States Patent
Horowitz et al.

(10) Patent No.: US 6,510,983 B2
(45) Date of Patent: *Jan. 28, 2003

(54) SYSTEM AND METHOD FOR TRANSFERRING VALUE TO A MAGNETIC STRIPE ON A TRANSACTION CARD

(75) Inventors: Edward Horowitz, Short Hills, NJ (US); Joseph C. Kawan, Hollywood, CA (US); Henry Lichstein, Santa Monica, CA (US)

(73) Assignee: Citicorp Development Center, Inc., Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,372

(22) Filed: Jul. 2, 1998

(65) Prior Publication Data

US 2001/0013542 A1 Aug. 16, 2001

Related U.S. Application Data

(60) Provisional application No. 60/051,668, filed on Jul. 3, 1997.

(51) Int. Cl.[7] .................................................. G06K 5/00
(52) U.S. Cl. ........................ 235/330; 235/375; 235/379; 235/487; 902/25; 902/26; 902/27; 705/64
(58) Field of Search ............................... 235/380, 379, 235/375, 487, 488, 493, 492; 902/25, 26, 27; 705/64, 67, 75

(56) References Cited

U.S. PATENT DOCUMENTS

| | | | | |
|---|---|---|---|---|
| 3,728,522 A | * | 4/1973 | Norwich | 235/380 |
| 4,612,436 A | | 9/1986 | Okada | 235/449 |
| 4,614,861 A | * | 9/1986 | Pavlov et al. | 235/380 |

(List continued on next page.)

FOREIGN PATENT DOCUMENTS

| | | | | |
|---|---|---|---|---|
| JP | 57156137 | * | 3/1984 | |
| JP | 60012136 | * | 8/1986 | |
| JP | 60012137 | * | 8/1986 | |
| JP | 61007908 | * | 7/1987 | 235/375 |
| JP | 61062971 | * | 9/1987 | |

OTHER PUBLICATIONS

International Preliminary Examination Report on PCT/US98/13581 dated Nov. 20, 1998.
Patent Cooperative Treaty Written Opinion, date of mailing Aug. 6, 1999.
International Standard—Anonymous; *Identification cards—Recording technique—Part 2: Magnetic stripe*, ISO/IEC 7811–2, 1995(E).

*Primary Examiner*—Michael G. Lee
*Assistant Examiner*—Jared J. Fureman
(74) *Attorney, Agent, or Firm*—George T. Marcou; Kilpatrick Stockton LLP (57) ABSTRACT

The present invention discloses a system and method enabling value stored in an advanced technology memory on a transaction card to be utilized in a magnetic stripe transaction with the card. The invention provides a special transaction number that is encrypted and recorded on the magnetic stripe of the card. The special transaction number comprises the value to be transferred or transaction amount, a personal identification number ("PIN"), and an account number. The special transaction number is recorded in a non-discretionary data field. Further, an indicator character may also be recorded on the magnetic stripe to alert a host system of a financial institution of the existence of the special transaction number. Thus, the special transaction number is read during a magnetic stripe transaction and the value represented by the special transaction number may be utilized to perform the transaction.

14 Claims, 4 Drawing Sheets

U.S. PATENT DOCUMENTS

| | | | |
|---|---|---|---|
| 4,630,201 A | * 12/1986 | White | 235/379 X |
| 4,683,372 A | 7/1987 | Matsumoto | 235/492 |
| 4,684,791 A | 8/1987 | Bito | 235/380 |
| 4,697,073 A | 9/1987 | Hara | 235/487 |
| 4,825,052 A | * 4/1989 | Chemin et al. | 235/380 |
| 4,825,054 A | 4/1989 | Rust et al. | 235/380 |
| 4,837,422 A | 6/1989 | Dethloff et al. | 235/380 |
| 4,868,376 A | * 9/1989 | Lessin et al. | 235/492 |
| 4,877,947 A | 10/1989 | Mori | 235/381 |
| 4,931,623 A | * 6/1990 | Nakamura et al. | 235/488 |
| 4,959,788 A | 9/1990 | Nagata et al. | 364/408 |
| 4,968,873 A | 11/1990 | Dethloff et al. | 235/380 |
| 4,995,081 A | 2/1991 | Leighton et al. | 380/23 |
| 5,140,517 A | 8/1992 | Nagata et al. | 364/408 |
| 5,204,513 A | * 4/1993 | Steele | 235/449 |
| 5,267,314 A | * 11/1993 | Stambler | 705/75 X |
| 5,317,138 A | * 5/1994 | Togawa | 235/440 |
| 5,397,886 A | * 3/1995 | Mos et al. | 235/475 |
| 5,428,684 A | 6/1995 | Akiyama et al. | 380/25 |
| 5,446,796 A | 8/1995 | Ishiguro et al. | 380/24 |
| 5,502,765 A | 3/1996 | Ishiguro et al. | 380/24 |
| 5,544,246 A | 8/1996 | Mandelbaum et al. | 380/23 |
| 5,590,197 A | 12/1996 | Chen et al. | 380/24 |
| 5,591,949 A | * 1/1997 | Bernstein | 235/380 |
| 5,604,802 A | * 2/1997 | Holloway | 705/75 X |
| 5,623,552 A | * 4/1997 | Lane | 382/124 |
| 5,682,027 A | 10/1997 | Bertina et al. | 235/380 |
| 5,748,737 A | * 5/1998 | Daggar | 380/24 |
| 5,796,083 A | * 8/1998 | Kenneth et al. | 255/380 |
| 5,949,046 A | * 9/1999 | Kenneth et al. | 235/380 |

* cited by examiner

SYSTEM AND METHOD FOR TRANSFERRING VALUE TO A MAGNETIC STRIPE ON A TRANSACTION CARD

CROSS-REFERENCE TO RELATED APPLICATIONS

This application claims the benefit of U.S. Provisional Application No. 60/051,668, filed Jul. 3, 1997.

FIELD OF THE INVENTION

The present invention relates to financial transaction cards, and more particularly, to a system and method for transferring value on a transaction card from an advanced technology memory on the card to a magnetic stripe memory on the card.

BACKGROUND

It has been suggested that the extensive use of transaction cards having magnetic stripe memories, such as credit, debit and stored value cards, is inhibiting the growth of more advanced and powerful cards. With the latest technological advances transaction cards having integrated circuit memories, called smart cards, optical memories and thin film semi-conductor memories give consumers superior functionality and security. Yet, the large installed base of devices that only interact with magnetic stripe cards provides a huge obstacle to the commercial success of the lees technology transaction cards. Thus, a system is desired for providing a single transaction card that can interact with the installed base of devices dedicated to magnetic stripe cards, and also provide the advanced functionality and security of the latest technology memories.

Although the use of magnetic stripe cards is common, their utility is confined by their relatively limited memory capability. The magnetic stripe on a typical card comprises 3 tracks where data can be stored and accessed. The standards for determining location and types of data to be stored on the tracks are identified in standards issued by the International Standards Organization (ISO). Generally, certain industry information must be maintained on certain portions of the tracks, while other portions of the tracks may have open data fields. Standard information, such as the cardholder's name and account number, and the issuing banks routing number, must be stored on the tracks.

For example, when a magnetic stripe card is swiped in an Automated Teller Machine (ATM) transaction, the on-line ATM reads the account number information on the card and prompts the user to verify their identity by entering a Personal Identification Number (PIN). Also, the ATM prompts the user to identify the transaction, such as to make a checking withdrawal. Typically, the ATM then accesses the appropriate account in the on-line system and insures that the entered PIN matches the account PIN that is stored on-line. Further, the account balance is checked to insure that the transaction is not in excess of the account balance. When the PIN's match and the account balance is sufficient, the ATM allows a transaction to proceed and the on-line account information is adjusted accordingly. This is just one example of how an ATM transaction may proceed, but other steps or a variation of the above steps may occur. Thus, the use of a transaction card in an ATM allows access to an on-line account that may be utilized to access funds to be dispensed by the ATM as cash.

After the magnetic stripe card is initialized with the customer's name and account number, typically no further data is recorded onto the magnetic stripe on the card. The information contained in the stripe is just read for identification purposes so that the on-line system can be accessed. Thus, magnetic stripe cards are limited to being used to access accounts available only through on-line systems.

In contrast, cards having advanced technology memories are highly functional and the data may be read from and written to the memories. Suitable advanced technology memories include integrated circuit (IC) memories, also know as smart cards. Smart cards are similar to magnetic stripe cards in size and appearance, but instead of having a magnetic stripe along the back side, they have a microcomputer chip embedded within the card. Current technology integrated circuit chips give smart cards the ability to store about 16 kilobytes of E-squared memory. Because the advanced technology memories have computer functionality, they have the ability to store and run programs that can manipulate data. One advantageous feature of advanced technology memories such as smart cards is their ability to provide encryption technology that may be used to encode data to insure the security of the data. Thus, the advanced technology memories provide functional and security advantages not present in a magnetic stripe memory.

As mentioned above, however, many consumers may not be able to take advantage of the advanced technology memories because the businesses in their area may not provide devices capable of reading and writing to the advanced technology memories on transaction cards. In this situation, a consumer may be reluctant to obtain a transaction card with advanced functionality and security because they have limited usage in their area. Although local businesses may not provide devices for using cards with advanced technology memories, however, a consumer may still desire to obtain such a card for their own personal use, such as on a networked computer. For example, a consumer may use a transaction card with a smart card memory in conjunction with a smart card reader/writer and a personal computer or personal digital assistant in communication with a merchant on the Internet. The smart card allows the consumer to make a secure electronic transaction over the Internet. Similarly, the consumer may utilize such a set-up to communicate with their bank and transfer money into an electronic purse application within the smart card. Thus, even though advanced technology card usage is not accepted by local businesses, consumers may desire to utilize advanced technology cards for other reasons.

Further, with the internationalization of business, many communities in remote parts of the world are exposed to current financial devices, like credit cards, debit cards, and smart cards, but they may not be able to take advantage of them because they do not have the infrastructure to immediately support every new advance in technology. Despite this difficulty, it is desirable to bring these areas up to speed so that outside business can effectively deal with these communities. Further, the consumers in these communities desire to conduct transactions utilizing the latest devices. Thus, a single card with advanced technology memory that can interact with current systems is desired.

Therefore, a solution to these problems is desired to allow consumers to utilize a transaction card having advanced technology memories and be able to utilize the functional and security features of the advanced technology memories within the current installed base of devices that only read the card's magnetic stripe.

SUMMARY OF THE INVENTION

The present invention deals with leveraging the use of transaction cards having advanced technology memory capabilities, such as integrated circuit (IC) or chip memory, i.e. "smart cards," optical stripe memory and thin film semi-conductor memory, within the established network that exclusively services magnetic stripe cards. The network includes automated teller machines (ATM's), customer access terminals (CAT's), the Internet, merchant terminals and their associated funds transfer communications network that allows a transaction card holder to obtain cash or transfer value at numerous locations worldwide. The present invention provides a card that combines the magnetic stripe memory with one or a combination of the advanced technology memories and allows the memories to cooperatively interact. The cooperative interaction allows at least a portion of the capabilities of the advanced technology memories to be utilized through the magnetic stripe memory. In particular, the present invention provides a system and method for securely transferring value on a transaction card from an electronic purse within an advanced technology memory, such as the integrated circuit memory, to the magnetic stripe. Thus, the present invention provides a system and method for enabling the utilization of the advanced technology memory capabilities of the transaction card in the current network of devices that exclusively serve magnetic stripe memory cards.

The present invention discloses a method for performing a secure financial transaction utilizing the magnetic stripe memory of a transaction card, having a magnetic stripe memory and at least one advanced technology memory, comprising the steps of modifying data necessary to effect a funds transfer to form an special transaction number and storing the special transaction number on the magnetic stripe memory of the card. The special transaction number provides access to at least a portion of a value held within the at least one advanced technology memory on the card. The advanced technology memory comprises at least one of an integrated circuit memory, an optical stripe memory, and a thin film semi-conductor memory. The modifying step comprises generating the special transaction number preferably with the encryption capability of the at least one advanced technology memory on the card, but the special transaction number may be encrypted by a device, in communication with the card, capable of reading and writing to an advanced technology memory and a magnetic stripe memory. The reading and writing device comprises a device selected from the group consisting of a personal digital assistant, an automated teller machine, a customer access terminal, and a merchant terminal. Further, the modifying data step may comprise encrypting the data using a public key/private key encryption system and/or a synchronized clock encryption system.

Additionally, the storing step may comprise recording the Hal transaction number on the magnetic stripe memory in a discretionary data field, a non-discretionary data field, and/ or a combination of both. When the storing step comprises recording the special transaction number in a non-discretionary data field, the special transaction number may be recorded in place of at least a portion of a personal account number. Further, the present invention may also comprise recording an indicator character on the magnetic stripe memory to indicate to the system reading the magnetic stripe that the special transaction number is not a typical account number. The indicator character may be recorded in a discretionary data field or in a non-discretionary data field.

Furthermore, the present invention discloses a system for transferring value on a multi-memory transaction card from an advanced technology memory to a magnetic stripe memory. The system comprises a transaction card having an advanced technology memory and a magnetic stripe memory. The advanced technology memory comprises an electronic purse having an electronic purse value. The magnetic stripe memory comprises non-discretionary data fields for recording a personal account number, and the magnetic stripe memory also has discretionary data fields. Further, the system provides a reader/writer device in communication with the advanced technology memory and the magnetic stripe memory. And finally, an encrypted special transaction number is recorded on the magnetic stripe memory, and the special transaction number effects the transfer of at least a portion of the electronic purse value.

The advanced technology memory comprises at least one of an integrated circuit memory, an optical memory and a thin film semi-conductor memory. The reader/writer device comprises at least one of a personal digital ant, an automated teller machine, a customer access terminal, and a merchant terminal. The special transaction number comprises a cash value, also referred to as a transaction value, and a personal identification number. Additionally, the special transaction number is encrypted by the advanced technology memory and/or by the reader/writer device. Further, the system may comprise an indicator character recorded on the magnetic stripe memory in the discretionary data field or in the non-discretionary data field.

In another embodiment, a system for using value stored in an advanced technology memory on a multi-memory transaction card utilizing a magnetic s memory on said card. The system comprises a transaction card having an advanced technology memory and a magnetic stripe memory. The advanced technology memory comprises an integrated circuit memory with an electronic purse having an electronic purse value. The magnetic stripe memory comprises non-discretionary data fields for recording a personal account number, and also comprises discretionary data fields. The system further comprises a special transaction number recorded on the magnetic stripe memory. The special transaction number represents at least a portion of the electronic purse value. Also, the system has a reader/writer device in communication with the advanced technology memory and the magnetic stripe memory. The reader/writer device generates the special transaction number. Finally, the system has a terminal device that dispenses credit for an amount equivalent to the portion of the electronic purse value represented by the special transaction number. The reader/writer device and the terminal device may be the same device.

DETAILED DESCRIPTION OF THE INVENTION

Figure 1:
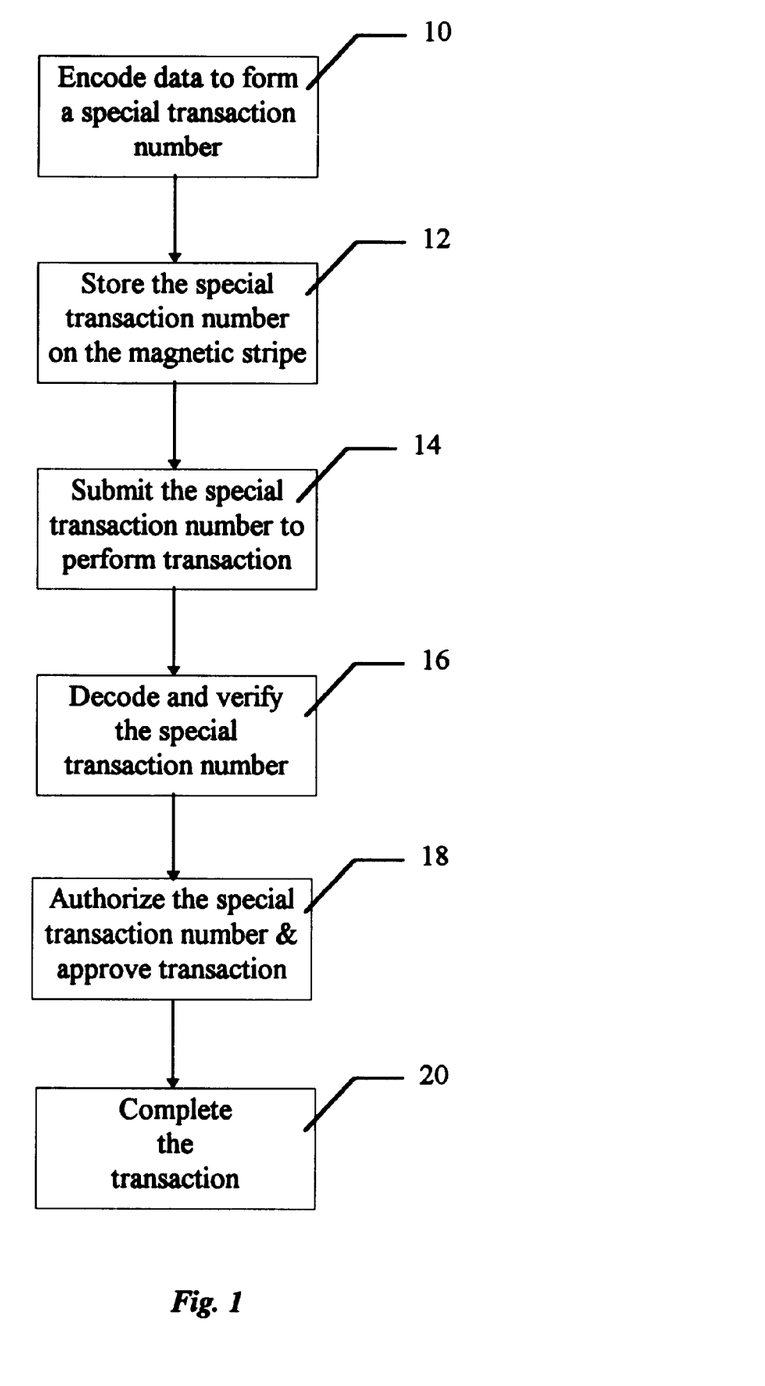
FIG. 1 is a flow chart representing some of the basic steps of the present invention.

According to the present invention, referring to FIG. 1, a system for performing a secure financial transaction utilizing the magnetic stripe memory of a transaction card generally comprises encoding data necessary to effect a funds transfer onto the magnetic stripe memory of the card (block 10). The encoded data forms a special transaction number that is stored in a standard format on the magnetic stripe memory of the card (Block 12). When the magnetic stripe memory of the card is utilized in a transaction, the special transaction number is used to perform the transaction (Block 14). The special transaction number is decoded by a financial institution and verified (Block 16). Upon proper verification, the financial institution authorizes the completion of the transaction (Blocks 18 and 20). Thus, a secure financial transaction is performed utilizing the magnetic stripe memory of the transaction card.

The present invention utilizes a typical transaction card, also referred to as an identification card, such as a credit card, ATM card and debit card. The card comprises a series of numbers imprinted on its face. The characters on the card may be from 14 to 19 characters, with the first 4 characters representing the routing number, also known as the bin number, of the bank sing the card. The remaining characters generally represent the issued version of the card and the account number associated with the card.

The card additionally comprises a magnetic stripe memory that is generally utilized to store the customer name, account number and bank routing number information. The magnetic stripe memory has 3 tracks where this information may be stored. There are international standards that control the format of how the information is recorded on these tracks. For example, the contents of each track are controlled by the International Standards Organization standard ISO/IEC 7811-2:1995(E), hereby incorporated by reference. ISO/EEC 7811-2:1995(E) provides for the uniform formatting of magnetic stripe information on all transaction cards to enable the cards to be universally read and accepted by financial networks. The ISO standard controls the encoding technique, format and amount of information on each track of the magnetic stripe memory.

For example, the standard designates a binary encoding technique, referred to as two-frequency recording, as the technique to be used for recording data on the tracks. Track 1 comprises 8.27 bits/mm and 79 characters, including alphanumeric characters. Track 2 is less bit-dense, comprising 2.95 bits/mm and 40 numeric characters, as it is most frequently utilized by magnetic stripe reading devices and must be highly reliable and repeatable. Track 3 is designated as a read/write track and comprises 8.27 bits/mm and 107 numeric characters. The present invention stores the special transaction number on one of the tracks, preferably track 2, of the magnetic stripe memory where it may be read by current magnetic stripe reading devices.

The special transaction number is a group of characters that is accepted by the network of automated teller machine ("ATM") devices, merchant terminals, customer access terminals ("CAT's") and the like, and recognized by a bank as a special account. For example, the special transaction number may comprise one character that provides an indicator to the financial institution that this is a special account, a plurality of characters that represent the user's personal identification number ("PIN"), a plurality of characters that represent all or a portion of an account number, and a plurality of characters that represent the amount of money involved in the transaction. The special transaction number may be recorded on one of the tracks of the magnetic stripe memory, as it is formatted to meet the standards of such information. Thus, the special transaction number is used like the typical account number to perform a financial transaction.

Figure 2:
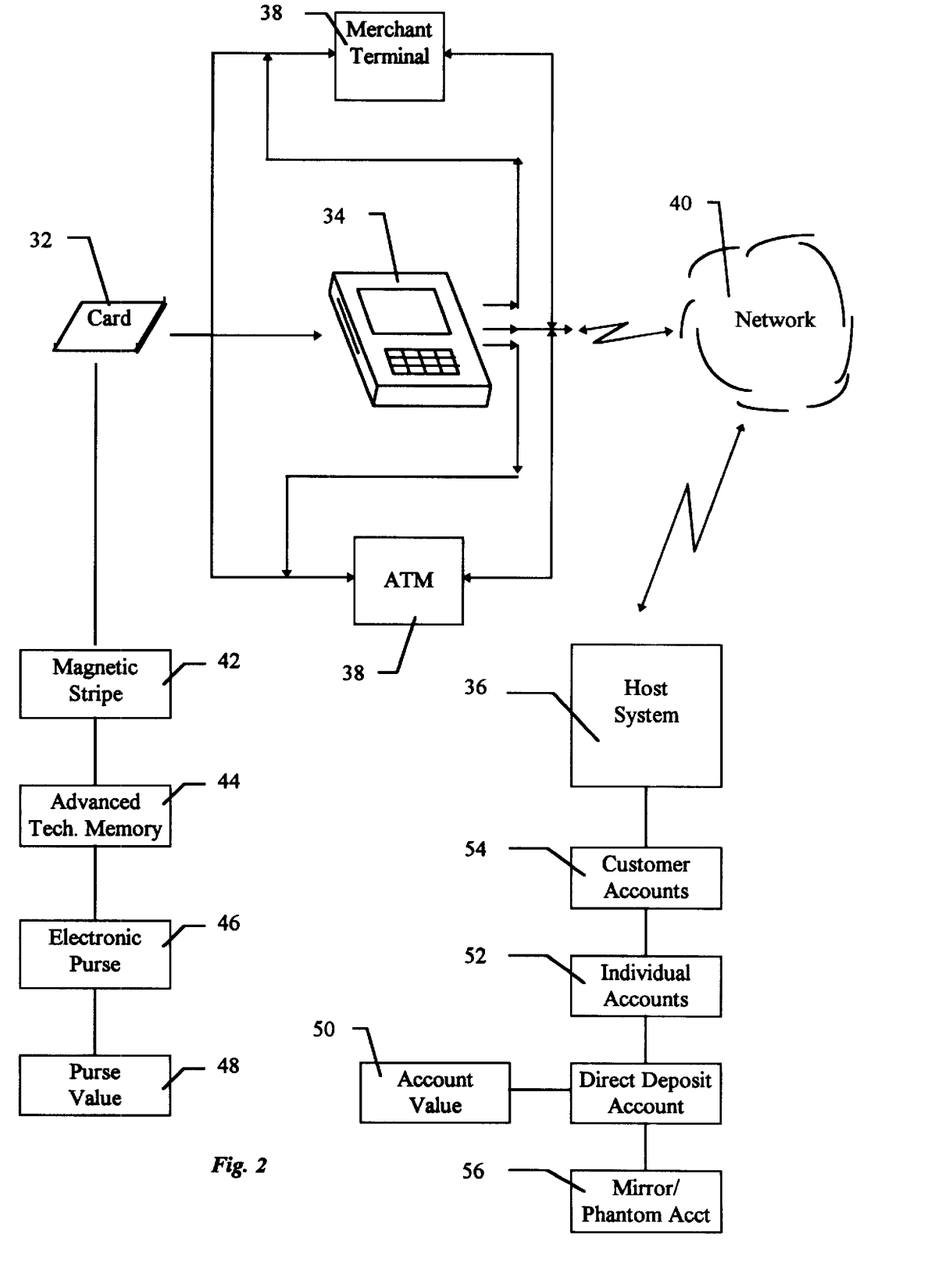
FIG. 2 is a schematic representation of an embodiment of the present invention.

According to the present invention, referring to FIG. 2, an embodiment of a system 30 for performing a secure financial transaction utilizing the magnetic stripe memory of a transaction card comprises a transaction card 32, a transaction card reader/writer device 34 in communication with a financial institution's host system 36 and/or a card reader and/or writer terminal 38 in communication with the host system 36 through a financial network 40. Transaction card reader/writer device 34 may be a personal digital assistant ("PDA") or other similar device capable of reading and writing to the various memories resident on card 32. Terminal 38 may be a merchant terminal, an ATM, a CAT and other similar devices that at least have the capability to read a magnetic stripe memory 42, and preferably an advanced technology memory 44, on the card. Transaction card 32 comprises a magnetic stripe memory 42 and at least one advanced technology memory 44, such as an integrated circuit (IC) or smart card memory, optical stripe memory and thin film semi-conductor memory. The advanced technology memory 44 comprises an electronic purse application 46 that stores a purse value 48 in the memory. For example, account value 50 may be transferred to a smart card memory 44 from an individual account 52 within the customer accounts 54 of the host system 36. Suitable individual accounts 52 may include a direct deposit account ("DDA") 58, a savings account, or the like. Account value 50 is transferred utilizing a smart card reader/writer device, such as PDA 34, in communication with the financial institution's host system 36 or through ATM 38 in communication with host 36 through network 40. Network 40 may be any communications network that allows card 32 to communicate with host system 36, such as an electronic funds transfer ("EFT") network, a telephone network or the Internet. Host system 36 tracks and stores all of the account information, transactions and balances for the financial institution's customer accounts 54. When the transfer occurs, host system 36 creates a mirror or phantom account 56, associated with the transfer, card number and/or smart card memory, that is used to account for the account value 50 transferred to the electronic purse 46.

The present invention enables the magnetic stripe memory to use purse value 48 stored in electronic purse 46 of advanced technology memory 44. As mentioned above, account value 50 may be transferred to electronic purse 46 of an advanced technology memory 44 on transaction card 32 through interaction with network 40. Alternatively, value may be transferred from one advanced technology memory to another advanced technology memory on the same card, or value may be transferred from one card to another card. Similarly, value may be transferred to the magnetic stripe from a plurality of sources, such as the magnetic stripe memory or advanced technology memory of other cards, the memory of card reader/writer units, and other similar devices.

Figure 3A:
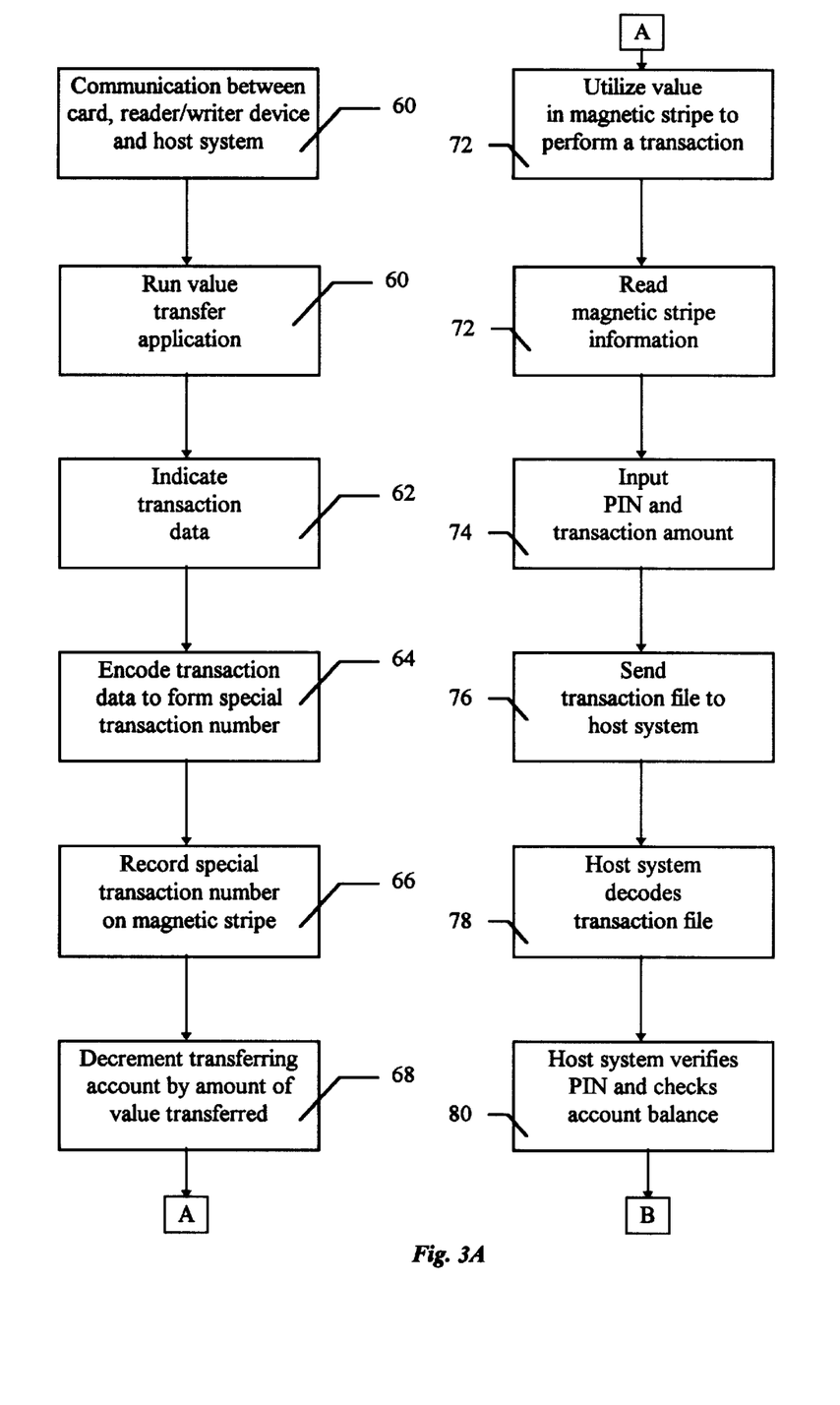
FIGS. 3A–3B are flow charts representing another embodiment of the invention.
Figure 3B:
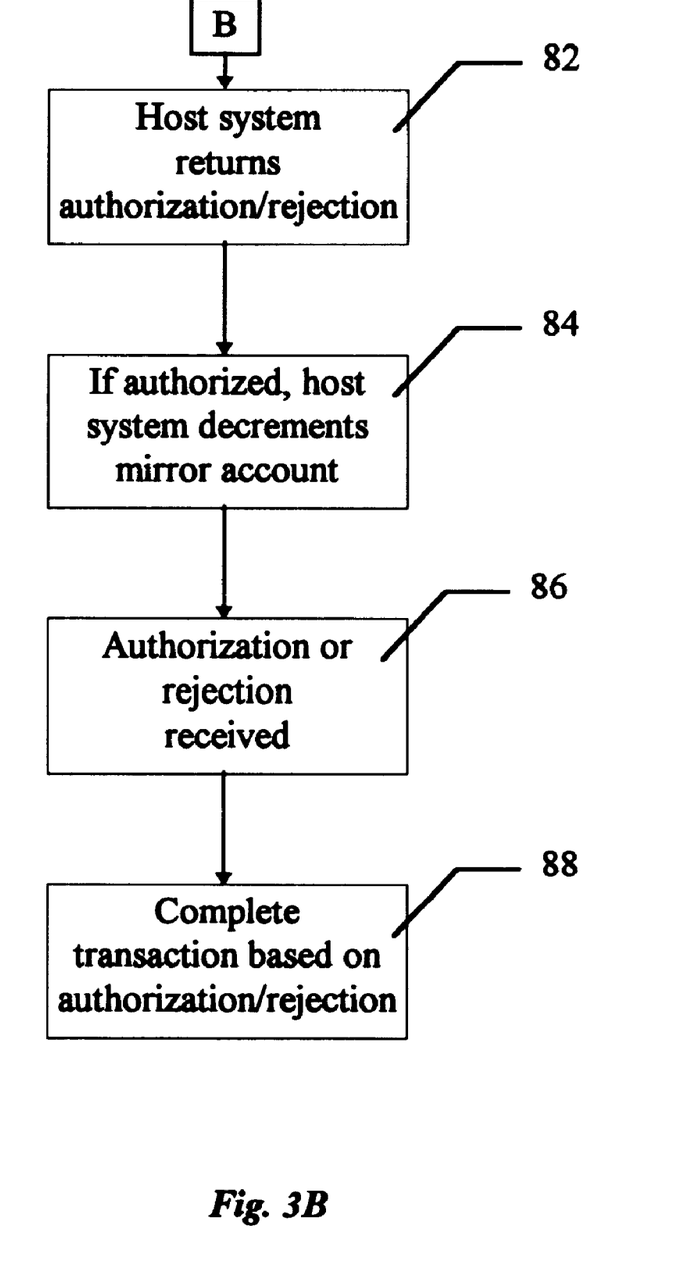

Referring to FIGS. 2 and 3A–3B, to transfer account value 48 to magnetic stripe memory 42, card 32 may be inserted into PDA 34, ATM 38, merchant terminal 38, or other similar electronic device capable of reading and writing to the advanced technology memory and magnetic stripe memory of the card (FIG. 3A, Block 60). PDA 34 and/or terminal 38 comprise an application that enables the transfer of value to magnetic stripe 42, such as value 48 from electronic purse 46 of advanced technology memory 44 (FIG. 3A, Block 62). The application allows the card holder to designate a set of transaction data, such as the value to be transferred, the identification of the electronic purse, a special PIN, etc. (FIG. 3A, Block 64). The application provides for the encoding and conversion of the transaction data into the special transaction number (FIG. 3A, Block 66 and FIG. 1, Block 10). The special transaction number is recorded onto the magnetic stripe memory (FIG. 3A, Block 68 and FIG. 1, Block 12). The application decrements the transferring account, such as the purse value 48 of electronic purse 46, by the amount of value transferred to magnetic stripe memory 42 (FIG. 3A, Block 70). Thus, the value from the advanced technology memory is transferred to the magnetic stripe memory, where it is utilized in the form of the special transaction number.

Once the special transaction number is recorded on magnetic stripe memory 42, then transaction card 32 may be utilized in a transaction using the value transferred from advanced technology memory 44. Referring to FIGS. 2 and 3A–3B, for example, the transaction card 32 may be inserts into ATM 38 to obtain cash. Magnetic stripe memory 42 is swiped to begin the transaction with ATM 38 (FIG. 3A, Block 74). The bank routing number and special transaction number are read by the ATM 38 (also see FIG. 1, block 14). ATM 38 then prompts for the input of a personal identification number ("PIN") and a transaction amount (FIG. 3A, Block 76). Upon input of the PIN and transaction amount, ATM 38 sends a transaction file comprising the PIN, the transaction amount and the special transaction number through financial network 40 and to host system 36 of the financial institution identified by the bank routing number (FIG. 3A, Block 78). Host system 36 opens and decodes the file, recognizing the indicator that highlights the number as a special account number that is associated with mirror/phantom account 56 (FIG. 3A, Block 80 and also see FIG. 1, Block 16). Host system 36 verifies the PIN and mirror/phantom 56 to insure the balance in mirror/phantom account 56 is greater than or equal to the transaction amount(FIG. 3A, Block 82 and FIG. 1, Block 16). Upon verification, host system 36 sends an authorization or refusal back to ATM 38 to release or refuse an amount of cash equal to the transaction amount, depending on if the balance of mirror account 56 is less than or equal to purse value 48 transferred to magnetic stripe memory 42 as identified in the special transaction number (FIG. 3B, Block 84 and FIG. 1, block 18). If the transaction is authorized, then the balance of mirror account 56 is decremented by the amount of value indicated in the transaction amount (FIG. 3B, Block 86). Upon receiving an authorization, ATM 38 dispenses cash for the transaction amount (FIG. 3B, Block 88–90 and FIG. 1, block 20). Upon receiving a refusal, ATM 38 may prompt for another transaction or the session may end (FIG. 3B, Block 90). Thus, the value from an advanced technology memory is utilize in a magnetic stripe memory transaction.

The present invention provides a number of alternatives for insuring that the special transaction number is secure. In one embodiment, the special transaction number is encoded using a secret from the smart card memory of the transaction card. The secret may comprise the public key of the financial institution, and any information encrypted with the financial institution's public key may only be decrypted by the financial institution using a related private key. This insures the security of the encrypted information. Further, the secret is preferably placed in the smart card memory by the financial institution, thereby insuring the security of a transaction involving the secret.

Alternatively, the secret may be provided by a trusted third party with the approval of the financial institution. In this embodiment, the data necessary to effect a funds transfer is encrypted using the secret from the smart card memory, which produces a cryptogram in the form of the special transaction number. Thus, only the financial institution having the private key, associated with the public key used to encrypt the data, is able to decrypt and interpret the special transaction number.

In another embodiment the security of the special transaction number may be insured by encoding the number with a time stamp utilize a very accurate clock associated with an encryption system. The clock, similar to those used in certification systems, and the encryption system may reside in the PDA or other similar device and are in synchronization with a clock and encryption system resident on the host system. This results in the encoded data having a time stamp that associates the encoded data with a particular encryption formula specific to that time. As a result, a set of data encoded at the specific time noted by the time stamp can only result in one particular set of encrypted data. Thus, by reading the time stamp on the special transaction number, the host system is able to determine the encryption formula and thus decrypt the special transaction number.

As mentioned above, the special transaction number may comprise a PIN and the value of the transaction, among other information. The PIN may be the same PIN typically associated with the card for magnetic stripe memory transactions, or the PIN may be a special transaction PIN created specifically for use with the special transaction number. The security of the invention is enhanced by comparing the PIN supplied at the time of the transaction with the PIN contained in the special transaction number. By verifying that the two PINs match, the system helps to insure that the transaction is being performed by an approved party.

Additionally, the special transaction number may be in a condensed format that represents the combination of PIN, value, and account numbers. For example, binary code or hexadecimal code may be utilized. The bits on track 2 of the magnetic stripe to record the account number, for example, may be utilized to record a binary or hexadecimal code representing the special transaction number. The current magnetic stripe reading devices read this code and translate it according to the current specification as identified in ISO/IEC 7811-2; 1995(E). As mentioned above, however, one of the bits is used to signal the host system that the number is actually a special transaction number. As such, the host system converts the number from that as specified in the ISO standard to a number based on the coding system, such as a binary number or hexadecimal number. The use of a binary or hexadecimal coding system provides a condensed format for the special transaction number to represent more information than just the account number, but in the same amount of space on the magnetic stripe.

Using binary code, the system may perform as follows. On track 2 of the magnetic stripe, 40 characters utilizing 5 bits per character are available. Typically only a portion of the total characters are able to be used for storing information, as many of the characters are reserved for hardware control purposes. Therefore, assume only 19 characters are typically available to store the bank routing number and the customer account number. These 19 characters represent a total of 95 bits. Utilizing binary code, these 95 bits may represent a number from 0 to $(2^{95}-1)$, or 0 to $3.9614 \times 10^{28}$. It should be recognized, however, that some of the bit sequences are reserved for hardware control purposes. There are plenty of bits available, therefore, to encode onto the magnetic stripe a very large number representing a PIN, an account number, a transaction amount, and any other pertinent information. Additionally, depending on the coding scheme, alphabetic characters may be recognized. Thus, the special transaction number may comprise a PIN, a transaction amount, an account number, an indicator, and any other alphanumeric representation that is encrypted together.

Alternatively, the bits of the special transaction number may be broken up to represent various portions of the information separately. For example, since the bank routing number is typically 4 digits, it can range from 0000 to 9999. Using binary code, the numbers from 0000 to 9999 may be represented in 14 bits. For example, if the bank routing number 6218, this is represented as follows in binary:

Bit: 0 1 2 3 4 5 6 7 8 9 10 11 12 13
Recorded As: 0 1 0 1 0 0 1 0 0 0 0 1 1 0
Binary: 0+2+0+8+0+0+64+0+0+0++2048+4096+0=6218

Alternatively, each character of the bank routing number may be individually represented in binary. This method is not as efficient, however, as each character requires 4 bits. For example, each character may be represented as follows:

| Character: | 6 | 2 | 1 | 8 |
|---|---|---|---|---|
| Bit: | 0 1 2 3 | 0 1 2 3 | 0 1 2 3 | 0 1 2 3 |
| Recorded As: | 0 1 1 0 | 0 1 0 0 | 1 0 0 0 | 0 0 0 1 |

Or, for example, less bits may be utilized if the total number of bits available are broken up into two strings. The first string of bits counts up to a number x, and then the next string of bits counts from x+1 to y, where x, x+1 and y represent numerals. The two strings of bits are then either summed up or combined to form one number. As one skilled in the art will realize, there are numerous schemes that may be utilized to represent a long string of alphanumeric or numeric-only characters in a condensed format.

In another embodiment the special transactions on number is recorded on the magnetic stripe memory using the coded character sets identified in ISO/IEC 7811-2: 1995(E). The special transaction number may be recorded in a discretionary data field, a non-discretionary data field, or a combination of both. On track 2 of a magnetic stripe, one example of a non-discretionary data field comprises 19 characters reserved for a personal identification number ("PAN") comprising the bank routing number and t individual account number. Similarly, on track 2 there are 13 characters available for discretionary data. Each of these characters comprises 4 bits. In recording the special transaction number in the non-discretionary data field, the special transaction number is written or recorded over all or at least a portion of the PAN. Similarly, the special transaction number may be recorded over all or a portion of the 13 character discretionary data field. Finally, in one embodiment, the special transaction number may be recorded over the PAN and an indicator of at least one character may be recorded a discretionary data field or in a non-discretionary data field to indicate to the system reading the magnetic stripe that the number in the PAN area is a special number.

For example, the special transaction number may comprise 10 characters, where 6 characters are used for the transaction amount or value to be transferred, and the remaining 4 characters are used for a special transaction PIN. An individual wishing to transfer value on a transaction card from the integrated circuit memory to the magnetic stripe memory inserts the card into a reader/writer device and indicates the transaction amount and the special PIN. This information is encrypted to form a special transaction number and then recorded on the magnetic stripe. Utilizing the recording technique identified in the ISO standard, the 10 characters comprising the special transaction number comprise a total of 40 bits that are recorded with a 1 or a 0 according to the coded character set.

Before recording the encrypted special transaction number comprising 40 bits, however, the system of the present invention provides a modifier that evaluates whether or not the encrypted special transaction number contains any string of 4 bits that cannot be used because they are reserved for hardware control purposes, as identified in the coded character set of the ISO standard. If the encrypted special transaction number would contains such a string of bits, then the modifier provides a revised special transaction number that does not contain such a string of bits along with a revision pointer, which may comprise a portion of the special transaction number, that notifies the system reading the special transaction number that it has been modified.

Finally, an indicator character is recorded in a discretionary or non-discretionary data field. The indicator character is recognized by the host system and identifies the special transaction number so that it is not confused with a typical account number. Thus, the present invention provides a system and method for securely transferring value to a magnetic stripe memory on a transaction card.

Although the invention has been described with reference to these preferred embodiments, other embodiments can achieve the same results. Variations and modifications of the present invention will be apparent to one skilled in the art and the following claims are intended to cover all such modifications and equivalents.

What is claimed is:

1. A method for performing a secure financial transaction utilizing a transaction card, having a magnetic stripe memory and at least one advanced technology memory, comprising the steps of:
    (a) generating a special transaction number by modifying transaction data, wherein the transaction data includes a personal identification number, an account number, and a transaction amount;
    (b) formatting the special transaction number according to one of a binary and hexadecimal coding system;
    (c) storing the special transaction number in a non-discretionary data field of the magnetic stripe memory that is normally reserved for a single account number, wherein the special transaction number provides access to at least a portion of a value held within the at least one advanced technology memory on the card; and
    (d) recording an indicator character in the non-discretionary data field on the magnetic stripe memory.

2. A method for performing a secure financial transaction as recited in claim 1, wherein the advanced technology memory comprises at least one of an integrated circuit memory, an optical stripe memory, and a thin film semiconductor memory.

3. A method for performing a secure financial transaction as recited in claim 1, wherein the modifying step comprises generating the special transaction number with the encryption capability of the at least one advanced technology memory on the card.

4. A method for performing a secure financed transaction as recited in claim 3, wherein the at least one advanced technology memory comprises at least one of an integrated circuit memory, an optical memory and a thin film semiconductor memory.

5. A method for performing a secure financial transaction as recited in claim 3, wherein the at least one advanced technology memory comprises an integrated circuit memory.

6. A method for performing a secure financial transaction as recited in claim 1, wherein the modifying step comprises generating the special transaction number with the encryption capability of a device capable of reading and writing to an advanced technology memory and a magnetic stripe memory.

7. A method for performing a secure financial transaction as recited in claim 6, wherein the reading and writing device comprises a device selected from the group consisting of a personal digital assistant n automated teller machine, a customer access terminal, and a merchant terminal.

8. A method for performing a secure financial transaction as recited in claim 1, wherein the modifying data step comprises encrypting the data using a public key/private key encryption system.

9. A method for performing a secure financial transaction as recited in claim 1, wherein the modifying data step comprises encrypting the data using a synchronized clock encryption system.

10. A system for transferring value on a multi-memory transaction card from an advanced technology memory to a magnetic stripe memory, comprising:

a transaction card having an advanced technology memory and a magnetic stripe memory;

the advanced technology memory including an electronic purse having an electronic purse value;

the magnetic stripe memory having a non-discretionary data field for recording a personal account number and an indicator character and having discretionary data fields;

a reader/writer device in communication with the advanced technology memory and the magnetic stripe memory for facilitating data transfers therebetween; and an encrypted special transaction number generated by the advanced technology memory by modifying a personal identification number, the personal account number, and a transaction amount and recorded in the non-discretionary data field in lieu of the personal account number according to one of a binary and hexadecimal coding system, the special transaction number effecting the transfer of at least a portion of the electronic purse value.

11. A system for transferring value on a multi-memory transaction card as recited in claim 10, wherein said advanced technology memory comprises at least one of an integrated circuit memory, an optical memory and a thin film semi-conductor memory.

12. A system for transferring value on a multi-memory transaction card as recited in claim 10, wherein said reader/writer device comprises at least one of a personal digital assistant, an automated teller machine, a customer access terminal, and a merchant terminal.

13. A system for transferring value on a multi-memory transaction card as recited in claim 10, wherein said special transaction number is encrypted by said advanced technology memory.

14. A system for transferring value on a multi-memory transaction card as recited in claim 10, wherein said special transaction number is encrypted by said reader/writer device.

* * * * *